United States Patent
Török

[11] Patent Number: 6,127,764
[45] Date of Patent: Oct. 3, 2000

[54] ELECTRIC MACHINE

[76] Inventor: Vilmos Török, Corso Fusina 2, CH-6911 Campione D'Italia, Switzerland

[21] Appl. No.: 09/319,120
[22] PCT Filed: Dec. 4, 1997
[86] PCT No.: PCT/SE97/02026
§ 371 Date: Jun. 2, 1999
§ 102(e) Date: Jun. 2, 1999
[87] PCT Pub. No.: WO98/25330
PCT Pub. Date: Jun. 11, 1998

[30] Foreign Application Priority Data

Dec. 4, 1996 [SE] Sweden ................... 9604493

[51] Int. Cl.[7] ............................. H02K 1/24; H02K 21/12; H02K 21/14
[52] U.S. Cl. ............................. 310/269; 310/156
[58] Field of Search ............................. 310/156, 256, 310/269, 86, 254, 261, 193

[56] References Cited

U.S. PATENT DOCUMENTS

| | | | |
|---|---|---|---|
| 3,171,049 | 2/1965 | Jarret et al. | 310/168 |
| 3,956,678 | 5/1976 | Byrne et al. | 310/216 |
| 4,260,926 | 4/1981 | Jarret et al. | 310/254 |
| 4,517,483 | 5/1985 | Hucker et al. | 310/156 |
| 4,661,736 | 4/1987 | Kawada et al. | 310/156 |
| 4,748,360 | 5/1988 | Kawada et al. | 310/156 |
| 5,631,512 | 5/1997 | Kawabata et al. | 310/156 |
| 5,682,073 | 10/1997 | Mizuno | 310/165 |

*Primary Examiner*—Clayton LaBalle
*Attorney, Agent, or Firm*—Browdy and Neimark

[57] ABSTRACT

An electric machine comprising a ferromagnetic first part (11) having a plurality of teeth (11C) arranged in a row, a ferromagnetic second part (12) having a plurality of poles (16, 17) arranged in a pole row confronting the row of teeth (11C) of the first part (11) and spaced from the row of teeth by an air gap (18), bearing means supporting the first and second parts (11, 12) for relative movement along the air gap (18), and winding means (15) associated with the first part (11) for producing a multipolar magnetic field continuously travelling along the air gap and linking the first and second parts (11, 12) across the air gap (18). The travelling magnetic field has an even number of poles and a pole pitch corresponding to the pole pitch of the second part (12). At least a section of at least some poles of the pole row of the second part (12) constitutes a soft-magnetic salient pole (17) which has over at least part of its length along the air gap (18) a saturation flux density at the surface thereof facing the air gap which is no higher than the flux density in the air gap which causes magnetic saturation of the teeth (11C) of the row of teeth of the first part (11).

14 Claims, 4 Drawing Sheets

$$w = \int_0^{H_x} J \cdot dH$$

ELECTRIC MACHINE

CROSS REFERENCE TO RELATED APPLICATION

The present application is the national stage under 35 U.S.C. 371 of PCT/SE97/02026, filed Dec. 4, 1997.

This invention relates to electrical machines, motors or generators, in which a travelling magnetic field causes the relative movement of the parts of the machines. More particularly, the invention relates to machines of the kind defined in the precharacterising parts of the independent claims.

For convenience, the description of the invention which follows is limited to rotational machines, namely motors, in which the part which carries the winding is stationary and designated as the stator, while the other part is designated as the rotor and mounted for rotation within the stator. The teeth of the stator and the poles of the rotor are arranged in annular concentric rows and separated by a cylindrical air gap. As will be readily understood, however, the relative movement of the parts need not be a rotational movement, but may be a linear or curvilinear relative movement. A combined rotational and linear relative movement is also within the scope of the invention. Moreover, the stator may be positioned inside the rotor, and the air gap need not be cylindrical but may be arcuate in cross-section or conical, for example.

In a common type of motor of the kind with which the invention is concerned the poles of the rotor are comprised of generally radially polarized permanent magnets the polarities of which alternate circumferentially. The permanent magnets may be mounted on the circumferential surface of the rotor or they may be mounted in rotor recesses (buried or nested magnets). Motors with surface mounted magnets are normally preferred, because they utilize the expensive permanent-magnetic material more economically than do motors with other magnet mounting designs.

An object of the present invention is to achieve a significant reduction of the amount of permanent-magnetic material with only a relatively small reduction of the torque produced by the motor.

A further object of the invention is to provide a machine of the kind indicated which lends itself to operation in the so-called field weakening mode; known machines with surface mounted permanent magnets on the rotor are severely limited in respect of such operation.

The invention is based on a combination of two observations.

Firstly, a high-performance permanent-magnetic body and a soft-iron body whose saturation flux density is roughly the same as the remanence of the permanent magnet are very similar in respect of their magnetic properties whenever the external magnetising field acts in the direction of the intrinsic polarization of the permanent magnet.

Secondly, in a permanent-magnet motor of the kind mentioned above which is provided with surface mounted permanent magnets and is supplied from a properly adjusted electronic drive, such as a servo amplifier, only one-half of the volume of each permanent magnet is exposed to a demagnetising field while the other half is exposed to a magnetic field in the direction of the intrinsic polarization of the permanent magnet.

From these observations it can be concluded that a considerable portion of the last-mentioned volume can be replaced with a body of soft-magnetic material having a suitable level of saturation flux density.

In accordance with one aspect of the invention there is provided an electric machine of the kind indicated in which

- each of an even number of poles of the pole row of the second part comprises a permanent-magnetic pole section and an adjacent soft-magnetic pole section,
- the permanent-magnetic and soft-magnetic pole sections are spaced-apart along the air gap, and
- the soft-magnetic pole section over at least a portion of its length along the air gap has at the surface thereof facing the air gap a saturation flux density which is no higher than the flux density in the air gap which causes magnetic saturation of the teeth of the row of teeth of the first part.

In a motor according to this aspect of the invention a saving of roughly 50 percent of the expensive permanent-magnetic material can be replaced with inexpensive soft-magnetic material without losing more than a small fraction of the torque.

In accordance with another aspect of the invention there is provided an electric machine of the kind indicated in which at least a section of at least some poles of the pole row of the second part constitutes a soft-magnetic pole which has over at least part of its length along the air gap a saturation flux density at the surface thereof facing the air gap which is no higher than the flux density in the air gap which causes magnetic saturation of the teeth of the row of teeth of the first part.

In a motor according to the second aspect, the permanent magnets may be omitted altogether. Such omission will result in a very substantial reduction of the torque in comparison with a motor according to the first aspect but will still represent an improvement in comparison with conventional reluctance motors without permanent magnets. Actually, a portion of the lost torque can be recovered by increasing the stator bore diameter, because the radical reduction of the flux in the yoke or backiron part of the stator resulting from the omission of the permanent magnets allows for a reduction of the cross-sectional area of the backiron, thus providing for an increased rotor diameter.

The invention will now be described in more detail with reference to the accompanying diagrammatic drawings, in which.

Figure 1:
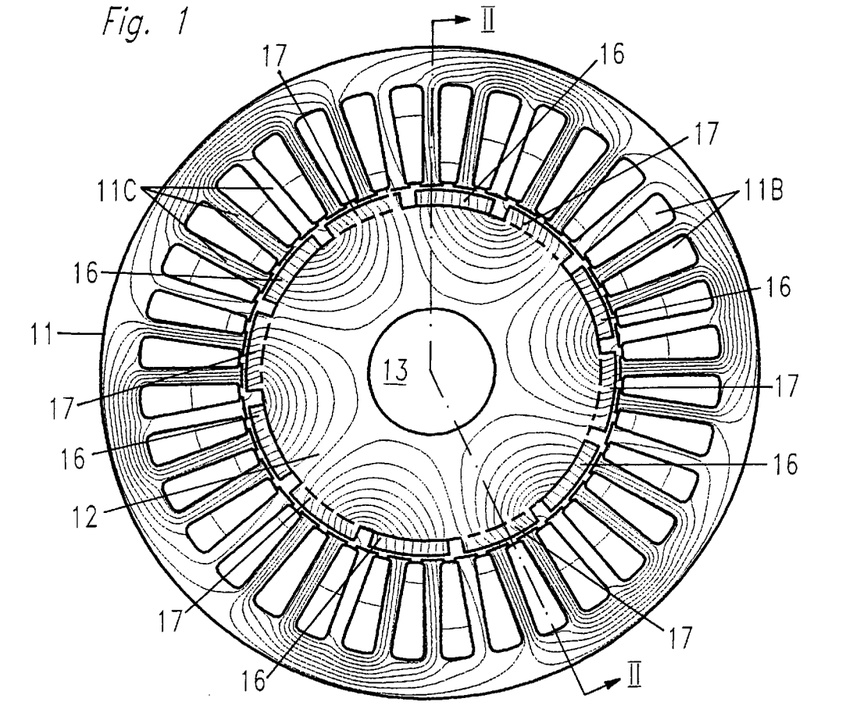
FIG. 1 is a cross-sectional view of an electric motor embodying the invention (the magnetic field pattern corresponding to current-carrying winding is indicated)
Figure 2:
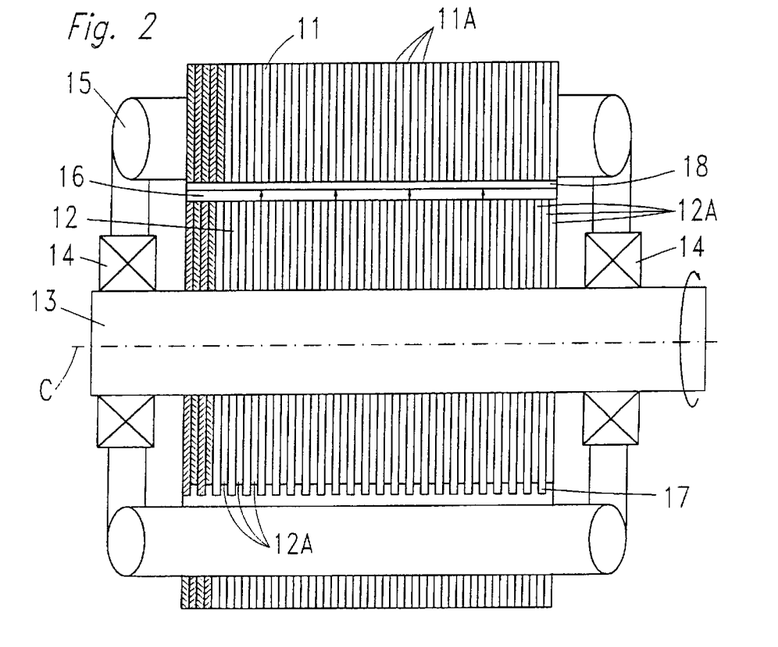
FIG. 2 is a longitudinal sectional view along the line II—II of FIG. 1.

The motor illustrated by way of example in FIGS. 1 and 2 is a rotational motor and comprises a soft-magnetic laminated first motor part 11, hereinafter termed stator, and a soft-magnetic laminated second motor part 12, hereinafter termed rotor, which is mounted inside the stator 11 for rotation relative to the stator about an axis C. A rotor shaft 13 journalled in bearings 14 supports the rotor in a fixed position relative to the stator. The thin electric-steel plates 11A and 12A forming the laminations of the stator and of the rotor lie in planes which are perpendicular to the axis C.

A three-phase winding 15 is provided on the stator 11 and positioned in a plurality of axially extending stator slots 11B separated by a circumferentially extending row of stator teeth 11C. The winding 15 may take different forms (see, for example T. Bödefeld and H. Sequenz, "Elektrische Maschinen", Springer-Verlag, Wien 1949, pp 102–105). For example, it may be a lap winding each coil of which encircles several teeth. The stator 11, including the associated winding 15, may be entirely conventionally designed and produced as a conventional induction motor stator, for example. In the illustrated example the winding coils produce a six-pole magnetic field travelling continuously, i.e. travelling at a velocity which is constant or substantially constant over the cycles when the motor is in steady-state operation.

Mounted on the cylindrical surface of the rotor 12 are six uniformly spaced, radially magnetised permanent magnets 16 the polarities of which alternate circumferentially. Six soft-magnetic rotor projections 17, which are uniformly spaced-apart and formed integrally with the rotor, alternate circumferentially with and are circumferentially spaced-apart from neighbouring permanent magnets 16. The permanent magnets 16 and the soft-magnetic rotor projections 17 form a circumferentially extending ring or row R of rotor pole sections 16, 17 (see also FIG. 3) in which each permanent-magnetic pole section 16 is functionally associated with the neighbouring soft-magnetic pole sections 17. The gaps separating the rotor pole sections 16 from the neighbouring rotor pole sections 17 are small in relation to the circumferential width of the pole sections and may even be non-existent.

The row R of rotor pole sections 16, 17 confronts the ring of stator teeth 11C and is separated from it by a narrow cylindrical air gap 18.

As is best shown in FIG. 2, in the portions of the rotor which form the salient soft-magnetic pole sections 17 every second lamination plate 12A' is shortened in relation to the neighbouring lamination plates 12A so that these pole sections are not formed by portions of tightly stacked electrical-steel plates but by plate portions which are separated by air.

Magnetically, the effect of this reduction or shortening of alternate rotor lamination plates 12A' and the consequent "thinned" design of the soft-magnetic pole sections 17 is a halving of the averaged value of the saturation flux density across the surface of the pole sections 17 facing the air gap 18 compared with the saturation flux density of a corresponding full or tightly stacked pole section. A greater or lesser degree of reduction of the saturation flux density can be achieved for example by varying the amount of reduction or shortening of alternate plates.

A similar reduction of the saturation flux density of the soft-magnetic pole sections 17 can also be achieved in ways other than the illustrated shortening of certain lamination plates. For example, all plates may have the same radial dimension and may instead be provided with recesses in the portions thereof which form the soft-magnetic pole sections. Such recesses serve to constrict the cross-sectional area of the plates presented to the magnetic flux and should be distributed substantially uniformly over the cross-section of the soft-magnetic pole sections. They may be in the form of holes, i.e. openings which have a closed contour and are thus not open to the air gap, or they may be openings which communicate with the air gap via narrow passages. A refinement can be achieved by recessing neighbouring plates differently.

A further possibility consists in making the soft-magnetic pole sections from composites of soft-magnetic material and non-magnetic material, the former material being in the form of particles distributed in a matrix of the latter, or from compacted flakes of non-magnetic material.

It is sufficient for the soft-magnetic pole sections 17 to have the reduced saturation flux density in the portion of the pole sections which is contiguous with the air gap 18. Preferably, the radial dimension or depth of the surface layer exhibiting the reduced flux density is at least approximately equal to the corresponding dimension of the air gap 18 but not substantially larger than the radial dimension of the permanent-magnetic pole sections 16.

Moreover, regardless of how the reduced saturation flux density of the soft-magnetic pole sections 17 is brought about, the saturation flux density preferably should be no higher than the flux density in the air gap which causes saturation of the stator teeth 11C. In other words, saturation of the soft-magnetic pole sections 17 should occur before the stator teeth or any other part of the magnetic circuit would become saturated.

Although the saturation flux density of the soft-magnetic pole sections should preferably be substantially equal to the remanence of the permanent-magnetic pole sections, an improved motor performance may in some cases be achieved by arranging for the soft-magnetic pole sections 17 to have a somewhat higher saturation flux density.

It should be noted that it is not necessary for the soft-magnetic pole sections 17 to have the above-mentioned surface saturation property over their entire circumferential length. Especially if the motor is adapted for torque development in one direction only, it is sufficient for the soft-magnetic pole sections to be surface saturable over their leading portions only. Naturally, they should be surface saturable throughout their axial length.

Each soft-magnetic pole section 17 should be separated from neighbouring permanent-magnetic pole sections 16 such that undesired magnetic leakage between neighbouring pole sections 16, 17 is minimized.

In the embodiment illustrated in FIGS. 1 and 2, the circumferential length of the permanent-magnetic pole sections 16 is approximately the same as that of the soft-magnetic pole sections 17. Preferably, the circumferential length of the soft-magnetic pole sections 17 is roughly 90 electrical degrees. It should be noted that although normally a circumferential length of about 90 electrical degrees is preferred, substantial deviations from this value of the circumferential length, such as ±30 electrical degrees, may be acceptable.

As is readily appreciated, the permanent-magnetic pole sections and the soft-magnetic pole sections should alternate throughout the circumference of the rotor as shown in FIG. 1. However, the motor according to the invention is operable even if such alternation exists only over selected portions of the circumference, although the rotor should preferably have an even number of combinations of a permanent-magnetic pole section and a soft-magnetic pole section.

Figure 3:
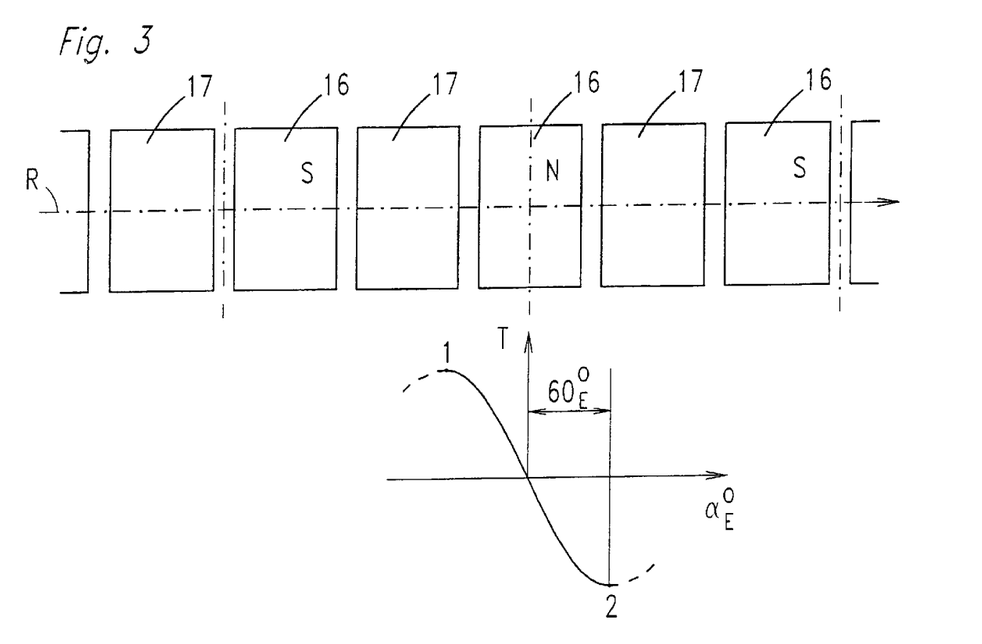
FIG. 3 is a developed fractional view of the row of rotor poles as viewed from within the air gap (for convenience of illustration the axial dimensions of the rotor pole sections are out of proportion with the circumferential dimensions)
Figure 4:
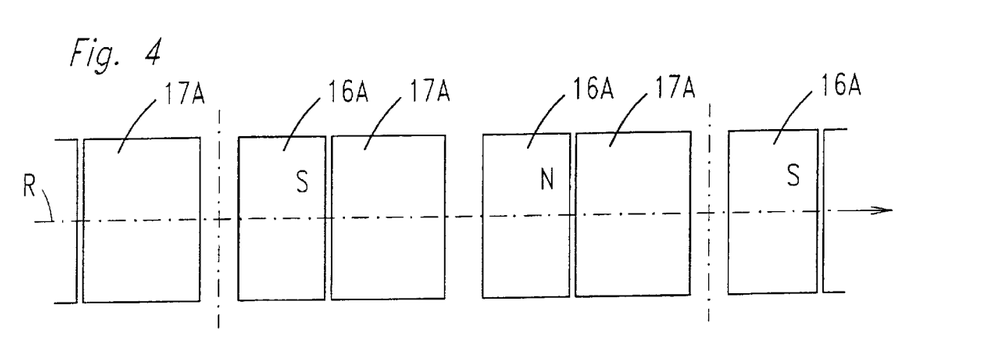
FIG. 4 is a view corresponding to FIG. 3 but showing a modified pole arrangement.

FIG. 4 shows a modification of the rotor pole arrangement which may be applied instead of the symmetrical arrangement shown in FIG. 3 when the motor need develop full torque only in one direction of rotation, the normal or preferred direction of rotation.

According to this modification, the circumferential length of the permanent-magnetic pole section 16A in each group consisting of a permanent-magnetic pole section 16A and a soft-magnetic pole section 17A is reduced in comparison with the embodiment in FIG. 3 while the circumferential length of the soft-magnetic pole section 17A is increased. Moreover, the spacing of the pole sections within each such group is increased while the spacing between the groups is decreased. By this embodiment an additional saving of permanent-magnetic material is can be achieved without sacrificing much of the torque developed in the normal or preferred direction of rotation.

There are numerous applications for electrical drives where, above a certain speed, the so-called base speed, it is sufficient to maintain a constant shaft power and where, accordingly, a gradual drop of the shaft torque is acceptable above that speed. In such applications, the voltage on the terminals of the motor may not increase when the speed exceeds the base speed, because otherwise the rated power, and thereby the cost of the electronic current supply, would increase. In drives for such applications, prior art permanent-magnet synchronous motors having surface mounted rotor magnets have almost prohibitive disadvantages.

These disadvantages can be substantially reduced in motors according to the invention, thereby rendering their use in applications of the above-mentioned kind advantageous, because it is possible to reduce the voltage which is induced in the stator winding as a consequence of the rotation of the rotor. The reduction of the induced voltage can be achieved by shifting the angular position of the crest of the wave of magnetomotive force, MMF, generated by the stator winding current with respect to the rotor. Prior art electronic devices, such as servo amplifiers for three-phase motors, can be used for controlling such shift.

If the stator has slots and teeth; as is the case in the embodiment illustrated in FIGS. 1 and 2, there is always an interaction between the discontinuous surface defined by the teeth and the edges of the moving rotor poles which causes a certain unevenness in the torque of the motor. In motors according to the invention this unevenness can be substantially reduced by conventional techniques used for other kinds of motors. For example, the stator slots and/or the edges of the rotor poles can be skewed, or the rotor poles can be axially subdivided and the resulting subsections of the poles can be shifted circumferentially a fraction of a slot pitch relative to adjacent subsections.

Another possibility, which can be used in motors according to the invention, is to distribute the rotor pole sections somewhat unevenly. For convenience of description of a method for accomplishing the uneven distribution the introduction of the concept of coincidence positions is useful.

For example, as regards the surface saturable salient pole sections, for each rotor revolution the leading edge of each such pole section will occupy a number of coincidence positions with respect to the stator, in which that leading edge stands opposite to the midpoint of one or another of the teeth of the stator, which equals the number of stator teeth.

The aim of the uneven distribution of the surface saturable salient pole sections could be to double the total number of coincidence positions by dividing these pole sections into two groups with identical coincidence positions in each group and to arrange for the coincidence positions of the two groups as seen along a rotor revolution to be interleaved. The number of groups may be increased further until each of the said sections constitutes a group on its own, in which case the total number of coincidence positions per rotor revolution would be equal to the number of stator teeth times the number of said sections, i.e. the number of groups, along the rotor circumference.

The same method could, instead, be applied to the permanent-magnetic pole sections, if any, along the rotor circumference or to both the surface saturable salient pole sections and the permanent-magnetic pole sections.

To minimize the so-called reluctance cogging torque in the currentless state of the winding, the circumferential length of the permanent-magnetic poles should be chosen to be equal to an integral multiple of the stator tooth pitch plus one-third of the width of the opening between adjacent stator teeth.

Generally, a salient pole with a constant air gap exerts a net tangential force when the stator MMF has different values at the generally axially extending leading and trailing edges of the pole. Conventional reluctance poles only shape the air gap separating the stator and the rotor to allow the magnetic flux to pass between the stator and the rotor primarily where the air gap is narrowest, but they do not absorb any appreciable part of the MMF driving the flux.

On the other hand, a salient pole whose surface reaches magnetic saturation flux density when subjected to a certain MMF produces a considerably higher torque than does any other salient pole which limits the air gap flux density to the same level by means of a wider air gap. This higher torque-producing capability is essential when reluctance pole sections are used instead of permanent-magnet sections having a high torque-producing capability. Consequently, the surface saturable property of the salient soft-magnetic pole sections is essential in motors according to the invention.

The higher torque-producing capability of surface saturable salient poles can be explained by an intellectual experiment. Let us regard one end of a parallelepipedic plunger made of magnetically saturable material which is halfway inside a plane parallel air gap between two poles of an electromagnet. Let us now energize the electromagnet and then allow the plunger to move a little further into the air gap whereupon we deenergize the electromagnet with the plunger remaining in the air gap. For the volume $\Delta V$ of air replaced by the tip of the plunger we draw the work-cycle diagram in FIG. 6 showing the magnetic flux $\phi$ versus the MMF.

In this diagram the line interconnecting point 1 with point 2 represents the magnetization of the air volume $\Delta V$. The line interconnecting point 2 with point 3 represents the movement of the tip of the plunger into the air volume $\Delta V$. At point 3 the electromagnet is deenergized with the plunger remaining stationary. The curved arrowed line connecting point 3 with point 1 is the demagnetization curve for the volume $\Delta V$ when that volume is occupied by the tip of the plunger.

Figure 6:
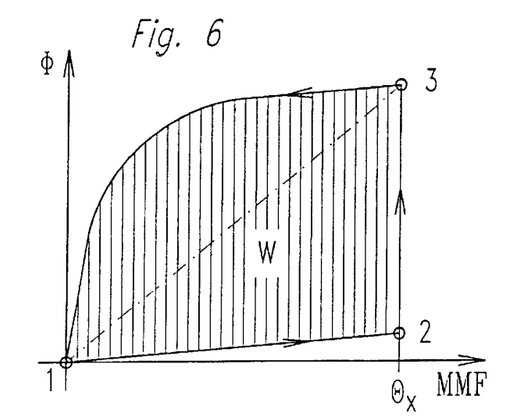
FIGS. 6 and 7 are diagrams illustrating characteristic operational features of the invention.

According to the laws of electricity, the work cycle area W, i.e. the hatched area in the diagram of FIG. 6, must equal the mechanical work performed by the plunger while moving into the volume $\Delta V$. It can be shown that for every unit volume of $\Delta V$ the electrical energy converted into mechanical work can be expressed in terms of the polarization curve of the plunger as shown in FIG. 7 so that $W = w \times \Delta V$.

From FIG. 6 it is evident that the curvature of the arrowed line interconnecting points 3 and 1 increases the mechanical work in comparison with the work represented by the area below the straight dash-dot line interconnecting points 3 and 1; that line represents a plunger made of a "linear" material or an equivalent combination of unsaturated iron and a suitable air gap.

Figure 7:
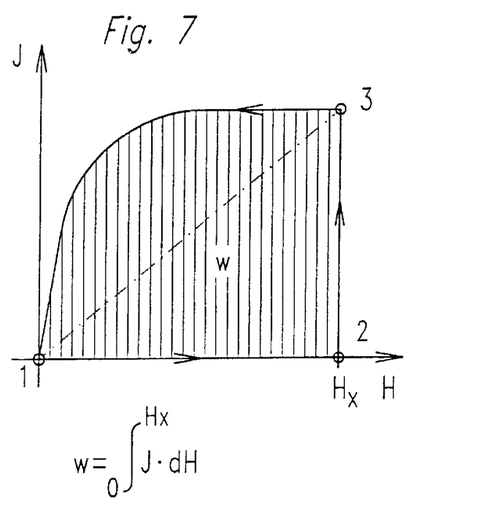

For high values of the magnetizing force H the diagram in FIG. 7 becomes practically rectangular. It is thus evident that the force exerted by a surface saturable salient pole can be almost twice that exerted by a conventional reluctance pole as represented by the straight dash-dot line which interconnects points 3 and 1 and represents a conventional reluctance pole.

A further advantage of the surface saturable salient pole is that it limits the flux even at overload conditions to nearly the same level as at rated load, so that other magnetic parts of the motor need not be overdimensioned to meet an overload condition.

The rotor of a motor according to the present invention as described above can be perceived as a modification of a permanent-magnet rotor with surface mounted permanent magnets, from which a part of each permanent magnet is cut away and replaced by a surface saturable salient pole. That saturable salient pole need not, however, be of the same size and does need not occupy exactly the spot on the rotor surface which was occupied by the piece of permanent magnet it replaces.

In principle a permanent-magnetic pole section and one of its two neighbouring surface saturable salient pole sections form a composite pole, which replaces a permanent-magnetic pole of bigger size than that of the actual permanent magnet. Which one of the neighbouring surface saturable salient pole sections can be regarded as being associated with a certain permanent-magnetic pole section depends on the direction of the magnetic field wave generated by the currents flowing in the stator winding, and the stator magnetomotive force, the stator MMF. The stator MMF in principle varies according to a sinusoidal wave, the amplitude and direction of which is determined by currents fed into the stator winding, a well known phenomenon.

Figure 5A:
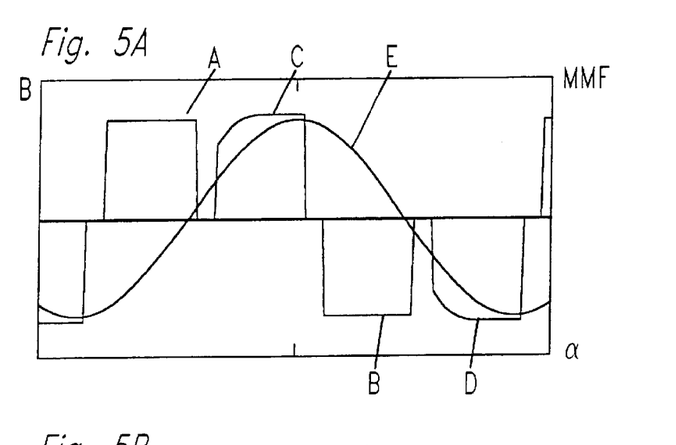
FIGS. 5A and 5B are diagrams representing respectively a prior art motor and a comparable motor according to the invention.
Figure 5B:
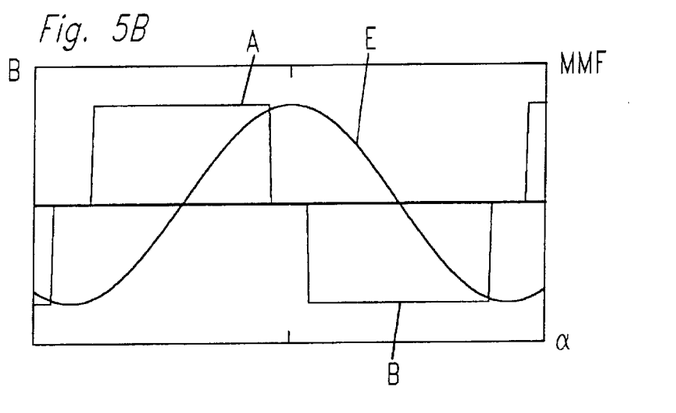

FIG. 5A shows, in a rather simplified form, the flux density profile (A), (B), (C) and (D) along the air gap of a motor according to the present invention as well as the MMF wave (E) generated by the polyphase winding of the stator. Profiles (A) and (B) correspond respectively to North and South pole permanent-magnetic pole sections. Profiles (C) and (D) correspond to surface saturable salient poles magnetised by the MMF wave (E). It is apparent that profiles (A) and (C) together resemble a profile of a bigger permanent-magnetic pole. The same applies for profiles (B) and (D). For comparison, FIG. 5B shows flux density profiles for a motor with twice as big permanent-magnetic poles and without saturable salient poles.

Concerning FIG. 5A it will be understood that a shift of the stator MMF wave (E) to the right, corresponding to about one third of the wavelength, would invert the polarities of all saturable salient pole sections while not affecting the polarities of the permanent-magnetic pole sections. The force exerted by the rotor would be reversed. Profiles (B) and (C) together would then resemble a profile of a bigger permanent magnet, instead of profiles (B) and (D) taken together, which was the case before the shift of the MMF wave to the right.

The torque developed by a rotor according to the present invention depends on both the amplitude and the direction of the MMF wave generated by the polyphase currents flowing in the stator winding, just as for the permanent-magnet rotor it replaces. For a given amplitude of the MMF wave it is the position of that wave relative to the rotor that is decisive. The diagram included in FIG. 3 shows this relationship graphically. For a symmetrical pole arrangement along the rotor surface as shown in FIG. 3, the useful operating area encompasses an angular segment of around ±60 electrical degrees, i.e. ±⅓ of the pitch of the permanent-magnetic pole sections centered about the midpoint of a permanent-magnetic pole section which becomes partially demagnetized by the stator MMF when the crest of that wave coincides with its midpoint. At this relative position of the stator MMF wave all permanent-magnetic pole sections are counteracted simultaneously or nearly simultaneously.

When the motor is operated at speeds up to the so called base speed, there is no reason to give the stator MMF wave any direction other than that at which maximum torque is developed by a given stator MMF wave amplitude, that is either in the direction corresponding to point 1 or to point 2 in the diagram of FIG. 3 depending on the direction of the torque required. In both cases all permanent-magnetic pole sections are repelled and all saturable salient pole sections are attracted by the stator MMF wave and both these forces act in the same direction.

The base speed is defined as the highest speed at which the current supply of the motor still can keep the motor current at its rated value. The base speed thus is not a trait of the motor itself, but a common trait of the motor and of the current source. When the motor is running above the base speed, the MMF wave of the stator must be directed so that the induced voltage of the motor is reduced, which is achieved by directing the MMF wave of the stator towards a suitable point between the points corresponding to points 1 and 2 in the diagram of FIG. 3. The reduction of the induced voltage is entirely due to the presence of the saturable salient pole sections; without them no significant reduction of the induced voltage at the rated current would be possible.

At a given motor speed and stator MMF wave amplitude the induced voltage may be reduced at most by a certain factor. This reduction factor, the field weakening ratio, may be increased by increasing the dimensions of the surface saturable salient pole sections and/or reducing the dimensions of the permanent-magnetic pole sections e.g. by increasing the circumferential length of the surface saturable salient pole sections and at the same time decreasing the corresponding dimension of the permanent-magnetic pole sections. A pole arrangement of this kind is shown in FIG. 4, which furthermore shows asymmetrically arranged surface saturable salient pole sections 17A between the permanent-magnetic pole sections 16A. This embodiment is most suitable for driving loads which need one torque direction all the time or at least most of the time, e.g. pumps and fans. It is evident that in a motor according to the present invention the remaining permanent-magnetic pole sections are more or less entirely repelled by the stator MMF and therefore can not be substituted by surface saturable salient poles. They can nevertheless be reduced further in size at the cost of a correspondingly reduced torque capability.

A natural next question is: if the permanent magnets be eliminated altogether, would a useful motor result? The answer is yes, a very robust motor, but with less than half of the torque capability of a motor having the mixed arrangement of permanent-magnetic and soft iron pole sections described above, and at the same time with a radically reduced flux in the back iron (yoke) of the outer part of motor. This would allow for a reduction of the cross-sectional area of the back iron, the stator bore diameter could be increased correspondingly and a part of the lost torque capability could be recovered. The result: a motor still weak compared with one with a mixed-pole rotor, but also without rotor losses.

Such a motor would be superior to known reluctance motors due to the superiority of the surface saturable salient pole over other types of salient poles and would possibly reach the torque capability of standard induction motors.

The motors described so far must be fed from controllable electronic power supplies which have to operate on information relating to the speed of the motor, such information being derived from a shaft sensor or a system computing the speed from measured voltages and currents accessible on the motor terminals. Otherwise, the motor would be subject to undesirable unstable hunting (oscillation) above a certain speed.

There are applications, however, where it is desirable for the motor to be stable without the use of a controllable electronic power supply. Typical applications of this nature are those in which the motor is connected directly to the mains, or in which a plurality of motors are supplied from a single electronic power supply and the motors are not mechanically interconnected, e.g, to drive different parts of a machine in synchronism.

The provision of a damper winding, e.g. in the form of squirrel cage winding, would make a motor having only surface saturable poles on the rotor capable of running in a group fed from a common variable frequency current supply or even fed directly from the mains.

A cage winding could also be applied to a mixed pole rotor, with bars placed for example in the interpole spaces. This would enable a group of mixed pole motors to be connected to a common current supply e.g. a variable frequency inverter.

FIGS. 8, 8A–8C show a modified rotor 112 which can be substituted for the rotor shown in FIG. 1. In this rotor 112 soft-magnetic pole sections have the "thinned" lamination design described above with reference to FIG. 2, and the rotor also has the slightly uneven distribution of the rotor pole sections, which is likewise described above although not shown in FIG. 1. In addition, the rotor 112 differs from the rotor of FIGS. 1 and 2 in respect of the mounting of the permanent-magnetic pole sections.

Figure 8:
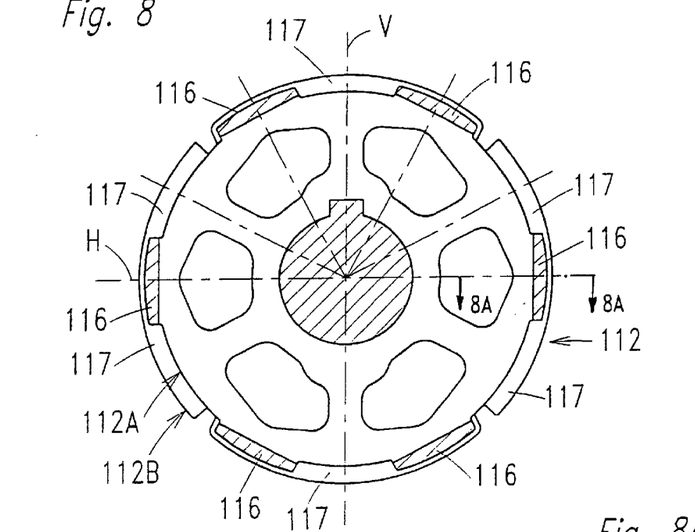
FIG. 8 is a cross-sectional view of a modified embodiment of the rotor of the electric motor shown in FIGS. 1 and 2.
Figure 8A:
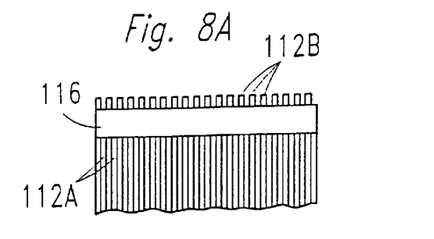
FIG. 8A is a slightly enlarged cross-sectional view on line 8A—8A of FIG. 8.
Figure 8B:
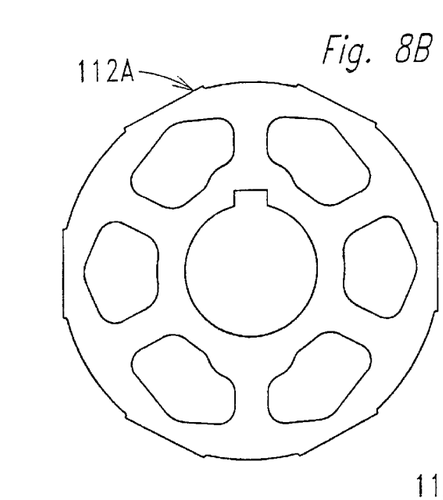
FIGS. 8B and 8C are elevational views of contiguous laminations of the rotor shown in FIG. 8.

Rotor 112 comprises a stack of stamped generally circular, coaxial laminations 112A and 112B of electric steel or other soft-magnetic material. Laminations 112A, which alternate with laminations 112B, are shortened in the manner described above and accordingly do not extend as far towards the stator as do the laminations 112B. FIG. 8A shows two such laminations 112A and 112B in the stack with lamination 112B positioned behind and thus largely concealed by lamination 112A. FIG. 8B shows the shape of laminations 112A and FIG. 8C shows the shape of laminations 112B.

Figure 8C:
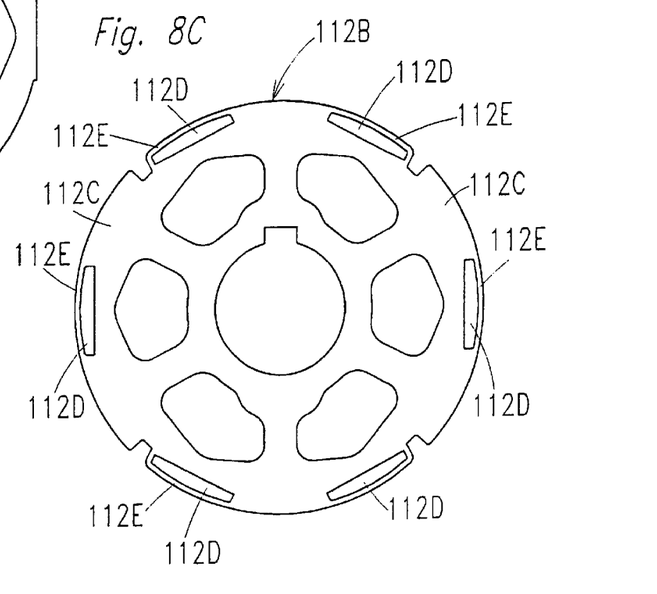

As best shown in FIG. 8C, the peripheral portion of each lamination 112B is divided into four arcuate segments 112C, each subtending slightly less than one-fourth of the circumference. Two diametrically opposite segments 112C are formed with a single elongate opening 112D shaped to fit the cross-sectional shape of permanent-magnetic bars 116 of uniform cross-section and a length corresponding to the length or height of the stack of laminations 112A, 112B. Each of the other two diametrically opposite segments 112C are formed with two similar openings 112D. Accordingly, each lamination 112B is provided with six circumferentially spaced-apart opening 112D. As will be explained below, the spacing of these openings is not exactly uniform.

When the stack of laminations 112A, 112B is assembled, the openings 112D in all laminations 112B are brought to register in the axial direction of the stack. Accordingly, the stack of laminations will define six axially extending passages or tunnels into which the six permanent-magnetic bars 116 can be slid to form the permanent-magnetic pole sections of the rotor and to be held captive therein. As is readily apparent from FIG. 8, those portions of the segments 112C which are situated between neighbouring permanent-magnetic bars or pole sections 116 form soft-magnetic pole sections 117 corresponding to the pole sections 17 in the motor shown in FIGS. 1 and 2.

The circumferentially extending narrow arcuate strips 112E outside the openings 112D and the remaining portions of the segments 112C, i.e. the segment portions forming the soft-magnetic pole sections 117, are spaced-apart axially by a gap of an axial width corresponding to the thickness of the interleaved laminations 112A, because as is seen from FIGS. 8A and 8B the laminations 112A do not extend beyond the underside or radially inner side of the permanent-magnetic bars 116. Thus, both the strips 112E forming "roofs" of the tunnels or passages accommodating the permanent-magnetic bars 116 and the other portions of the segments 112C, i.e. the soft-magnetic pole sections, will be sparsely laminated or "thinned" as described with reference to FIG. 2. The above-described favourable effect resulting from this thinning and the consequent reduction of the saturation flux density accordingly is also present in the rotor 112 shown in FIG. 8.

The structure shown in FIGS. 8, 8A–8C for accommodating and retaining the permanent-magnetic pole sections 116 is favourable also in other respects.

Because the rotor 112 requires no non-magnetic strapping or other non-magnetic means applied about the rotor to retain the permanent-magnetic pole sections 116 in position (such strapping or other means inevitably increases the air gap, i.e. the space between the stator and the rotor occupied by air an the non-magnetic retaining means, between the stator and the soft-magnetic pole sections), the rotor design shown in FIGS. 8, 8A–8C contributes to an increased torque.

Moreover, this design allows of a simple and cost-effective production of the rotor.

Additionally, this design makes it possible in a simple manner to accomplish an uneven spacing of the pole sections and thereby minimize the so-called reluctance cogging of the rotor resulting from the tendency of the permanent-magnetic pole sections to interact with the stator teeth to produce a retention torque keeping the rotor magnetically locked to the stator when the stator winding is deenergized.

In the rotor shown in FIGS. 8, 8A–8C both the soft-magnetic pole sections 117 and the permanent-magnetic pole sections 116 are positioned symmetrically with respect to both the vertical plane V and the horizontal plane H containing the rotor axis. As there are six pole sections of either type, a completely even spacing of the pole sections of each type would mean an angular spacing of 60° of pole sections of like types.

The uneven spacing of the soft-magnetic pole sections 117 has been accomplished by symmetrically displacing the two pole sections 117 in the upper rotor half closest to the horizontal plane H and the two pole sections 117 in the lower rotor closest to the horizontal plane angularly by 2.22° towards that plane from the positions corresponding to even spacing, so that each of these four pole sections will be centered on a radial line including an angle of 27.78° with the horizontal plane H.

Similarly, the uneven spacing of the permanent-magnetic pole sections 116 has been accomplished by symmetrically displacing the two upper and the two lower permanent-magnetic pole sections angularly by 2.22° towards the vertical plane V from the position corresponding to even spacing, so that each of these four pole sections will be centered on a radial line including an angle of 27.78° with the vertical plane.

Naturally, the above-described uneven spacing is just an example, being preferred for the stator shown in FIG. 1 in which the number of teeth 11C of the stator 11 is 27. The angular displacement of 2.22° corresponds to one-sixth of the stator tooth pitch (360°:27) and minimizes torque fluctuations in operation at low speeds and also minimizes the retention torque, thereby making skewing of the stator slots and the attendant production complications unnecessary even in high-performance servo motors.

Alternative Embodiments for Rotating Motors

Rotating motors, which consist of stator with associated winding means and a rotor, may have an air gap surface that is cylindrical, conical, disc-shaped, etc., in principle any shape of surface that a generatrix rotating about a stationary axis can describe.

Motors with axial or conical air gap surfaces may consist of two stator parts with winding means and a rotor placed between stator parts and having poles on both sides facing the air gaps formed with the stator. The rotor does not need to be equipped with flux return path (yoke).

A variant of this type of motor may be equipped with a third stationary stator part with associated winding means and placed between the other two stator parts and having air gap surfaces on two sides. Two rotor parts on a common shaft are arranged in the two interspaces between every two stator parts. The third stator part does not need to be equipped with flux return path (yoke).

It is understood that such a motor may also be provided with a fourth stator part, similar to the third one, and a third rotor part, so that the motor will have six air gaps but only two flux return paths, while in a conventional motor design two flux return paths, one on the stator part and one on the rotor part, are associated with every air gap.

It is understood that the above principle of building multirotor motors may be extended to any chosen number of rotors.

What is claimed is:

1. An electric machine comprising
   a ferromagnetic first part (11) having a plurality of teeth (11C) arranged in a row,
   a ferromagnetic second part (12; 112) having a plurality of poles (16, 17; 116, 117) arranged in a pole row confronting the row of teeth (11C) of the first part and spaced from the row of teeth by an air gap (18),
   bearing means supporting the first and second parts (11, 12; 112) for relative movement along the air gap, and
   winding means (15) associated with the first part (11) for producing a multipolar magnetic field continuously travelling along the air gap (18) and linking the first and second parts (11, 12; 112) across the air gap, the travelling magnetic field having an even number of poles and a pole pitch corresponding to the pole pitch of the pole row of the second part,
   characterised in that
     at least a section of at least some poles of the pole row of the second part (12; 112) constitutes a soft-magnetic salient pole which has over at least part of its length along the air gap (18) a saturation flux density at the surface thereof facing the air gap which is no higher than the flux density in the air gap which causes magnetic saturation of the teeth (11C) of the row of teeth of the first part (11).

2. An electric machine according to claim 1, in which the second part (12; 112) comprises a plurality of laminations (12A, 12B; 112A, 112B) of soft-magnetic material which are perpendicular to the air gap (18), characterised in that the surface region of the soft-magnetic salient poles (17; 117) or soft-magnetic salient pole sections (7; 117) which faces the air gap (18) has a plurality of local recesses providing a reduced cross-sectional area of the poles (17; 117) or pole sections (17; 117) adjacent to the air gap (18) or a plurality of soft-magnetic particles or flakes substantially uniformly distributed in a matrix.

3. An electric machine comprising
   a ferromagnetic first part (11) having a plurality of teeth (11C) arranged in a row,
   a ferromagnetic second part (12; 112) having a plurality of permanent-magnetic poles (16; 116) arranged in a pole row confronting the row of teeth of the first part (11) and spaced from the row of teeth by an air gap (18),
   bearing means supporting the first and second parts (11, 12; 112) for relative movement along the air gap, and
   winding means (15) associated with the first part (11) for producing a multipolar magnetic field continuously travelling along the air gap (18) and linking the first and second parts across the air gap, the travelling magnetic field having an even number of poles and a pole pitch corresponding to the pole pitch of the pole row of the second part (12; 112),
   characterised in that
     at least one pole, preferably each of an even number of poles, of the pole row of the second part (12; 112) comprises a permanent-magnetic pole section (16; 116) and an adjacent soft-magnetic salient pole section (17; 117), and
     the soft-magnetic salient pole section (17; 117) over at least a portion of its length along the air gap (18) has at the surface thereof facing the air gap a saturation flux density which is no higher than the flux density in the air gap which causes magnetic saturation of the teeth (11C) of the row of teeth of the first part (11).

4. An electric machine according to claim 3, characterised in that the permanent-magnetic pole sections (16A) are asymmetrically positioned between the soft-magnetic salient pole sections (17A) along the length of the air gap (18), preferably such that in each group consisting of a pair of soft-magnetic salient pole sections (17A) and an intervening permanent-magnetic pole section (16A), the permanent-magnetic pole section is offset in the preferred torque-development direction from a central position between the soft-magnetic salient pole sections.

5. An electric machine according to claim 3 in which the second part (12; 112) comprises a plurality of laminations (12A, 12B; 112A, 112B) of soft-magnetic material which are perpendicular to the air gap (18), characterised in that the surface region of the soft-magnetic salient poles (17; 117) of soft-magnetic salient pole sections (17; 117) which faces the air gap (18) has a plurality of local recesses providing a reduced cross-sectional are of the poles (17; 117) or pole sections (17; 117) adjacent to the air gap (18) or a plurality of soft-magnetic particles or flakes substantially uniformly distributed in a matrix.

6. An electric machine according to claim 5, characterised in that the permanent-magnetic pole sections (16A) are asymmetrically positioned between the soft-magnetic salient pole sections (17A) along the length of the air gap (18), preferably such that in each group consisting of a pair of soft-magnetic salient pole sections (17A) and an intervening permanent-magnetic pole sections (16A), the permanent-magnetic pole section is offset in the preferred torque-development direction from a central position between the soft-magnetic salient pole sections.

7. An electric machine comprising a ferromagnetic first part (11) having a plurality of teeth (11C) arranged in a row,
- a ferromagnetic second part (12; 112) having a plurality of poles (16, 17; 116, 117) arranged in a pole row confronting the row of teeth (11C) of the first part and spaced from the row of teeth by an air gap (18),
- bearing means supporting the first and second parts (11, 12; 112) for relative movement along the air gap, and
- winding means (15) associated with the first part (11) for producing a multipolar magnetic field continuously travelling along the air gap (18) and linking the first and second parts (11, 12: 112) across the air gap, the travelling magnetic field having an even number of poles and a pole pitch corresponding to the pole pitch of the pole row of the second part, characterized in that at least a section of at least some poles of the pole row of the second part (12; 112) constitutes a soft-magnetic salient Pole which has over at least part of its length along the air gap (18) a saturation flux density at the surface thereof facing the air gap which is no higher than the flux density in the air gap which causes magnetic saturation of the teeth (11C) of the row of teeth of the first part (11),
- wherein the length of the soft-magnetic salient poles (17; 117) or soft-magnetic salient pole sections (17; 117) as measured along the air gap (18) is not more than about one half of a pole pitch of the pole row of the second part (12; 112).

8. An electric machine comprising a ferromagnetic first part (11) having a plurality of teeth (11C) arranged in a row,
- a ferromagnetic second part (12; 112) having a plurality of poles (16, 17; 116, 117) arranged in a pole row confronting the row of teeth (11C) of the first part and spaced from the row of teeth by an air gap (18),
- bearing means supporting the first and second parts (11, 12; 112) for relative movement along the air gap, and
- winding means (15) associated with the first part (11) for producing a multipolar magnetic field continuously travelling along the air gap (18) and linking the first and second parts (11, 12: 112) across the air gap, the travelling magnetic field having an even number of poles and a pole pitch corresponding to the pole pitch of the pole row of the second part, characterized in that at least a section of at least some poles of the pole row of the second part (12; 112) constitutes a soft-magnetic salient pole which has over at least part of its length along the air gap (18) a saturation flux density at the surface thereof facing the air gap which is no higher than the flux density in the air gap which causes magnetic saturation of the teeth (11C) of the row of teeth of the first part (11),
- wherein said saturation flux density exists in a region of the soft-magnetic salient poles (17; 117) or soft-magnetic salient pole sections (117) the extension of which as measured transversely to the air gap (18) is at least about the width of the air gap.

9. An electric machine comprising a ferromagnetic first part (11) having a plurality of teeth (11C) arranged in a row,
- a ferromagnetic second part (12; 112) having a plurality of poles (16, 17; 116, 117) arranged in a pole row confronting the row of teeth (11C) of the first part and spaced from the row of teeth by an air gap (18),
- bearing means supporting the first and second parts (11, 12; 112) for relative movement along the air gap, and
- winding means (15) associated with the first part (11) for producing a multipolar magnetic field continuously travelling along the air gap (18) and linking the first and second parts (11, 12: 112) across the air gap, the travelling magnetic field having an even number of poles and a pole pitch corresponding to the pole pitch of the pole row of the second part, characterized in that at least a section of at least some poles of the pole row of the second part (12; 112) constitutes a soft-magnetic salient pole which has over at least part of its length along the air gap (18) a saturation flux density at the surface thereof facing the air gap which is no higher than the flux density in the air gap which causes magnetic saturation of the teeth (11C) of the row of teeth of the first part (11),
- wherein the second part (112) comprises a plurality of first-type and second-type laminations (112A, 112B) of soft-magnetic material which are perpendicular to the air gap (18), the second-type laminations (112B) being interleaved with the first-type laminations (112A),
- a peripheral region (112C) of each of the second-type laminations (112B) has a plurality of apertures (112D), each aperture being axially aligned with a corresponding aperture of the other second-type laminations (112B) to form an axially extending cavity for receiving one of the permanent-magnetic pole sections (116),
- the said peripheral regions (112C) of the second-type laminations (112B) extending radially beyond the first-type laminations, and
- portions of said peripheral regions (112C) located between the cavities forming the soft-magnetic pole sections (117).

10. An electric machine comprising a ferromagnetic first part (11) having a plurality of teeth (11C) arranged in a row,
- a ferromagnetic second part (12; 112) having a plurality of permanent-magnetic poles (16; 116) arranged in a pole row confronting the row of teeth of the first part (11) and spaced from the row of teeth by an air gap (18),
- bearing means supporting the first and second parts (11, 12; 112) for relative movement along the air gap, and
- winding means (15) associated with the first part (11) for producing a multipolar magnetic field continuously travelling along the air gap (18) and linking the first and second parts across the air gap, the travelling magnetic field having an even number of poles and a pole pitch corresponding to the pole pitch of the pole row of the second part (12; 112),
- characterized in that at least one pole, preferably each of an even number of poles, of the pole row of the second part (12; 112) comprises a permanent-magnetic pole section (16; 116) and an adjacent soft-magnetic salient pole section (17; 117), and
- the soft-magnetic salient pole section (17; 117) over at least a portion of its length along the air gap (18) has at the surface thereof facing the air gap a saturation flux density which is no higher than the flux density in the air gap which causes magnetic saturation of the teeth (11C) of the row of teeth of the first part (11),
- wherein the length of the soft-magnetic salient poles (17; 117) or soft-magnetic salient pole sections (17; 117) as measured along the air gap (18) is not more than about one-half of a pole pitch of the pole row of the second part (12; 112).

11. An electric machine according to claim 10, characterised in that the permanent-magnetic pole sections (16A) are asymmetrically positioned between the soft-magnetic salient pole sections (17A) along the length of the air gap (18), preferably such that in each group consisting of a pair of soft-magnetic salient pole sections (17A) and an intervening permanent-magnetic pole sections (16A), the permanent-magnetic pole section is offset in the preferred torque-development direction from a central position between the soft-magnetic salient pole sections.

12. An electric machine comprising a ferromagnetic first part (11) having a plurality of teeth (11C) arranged in a row, a ferromagnetic second part (12; 112) having a plurality of permanent-magnetic poles (16; 116) arranged in a pole row confronting the row of teeth of the first part (11) and spaced from the row of teeth by an air gap (18), bearing means supporting the first and second parts (11, 12; 112) for relative movement along the air gap, and winding means (15) associated with the first part (11) for producing a multipolar magnetic field continuously travelling along the air gap (18) and linking the first and second parts across the air gap, the travelling magnetic field having an even number of poles and a pole pitch corresponding to the pole pitch of the pole row of the second part (12; 112), characterized in that at least one pole, preferably each of an even number of poles, of the pole row of the second part (12; 112) comprises a permanent-magnetic pole section (16; 116) and an adjacent soft-magnetic salient pole section (17; 117), and the soft-magnetic salient pole section (17; 117) over at least a portion of its length along the air gap (18) has at the surface thereof facing the air gap a saturation flux density which is no higher than the flux density in the air gap which causes magnetic saturation of the teeth (11C) of the row of teeth of the first part (11), wherein said saturation flux density exists in a region of the soft-magnetic salient poles (17; 117) or soft-magnetic salient pole sections (117) the extension of which as measured transversely to the air gap (18) is at least about the width of the air gap.

13. An electric machine according to claim 12, characterised in that the permanent-magnetic pole sections (16A) are asymmetrically positioned between the soft-magnetic salient pole sections (17A) along the length of the air gap (18), preferably such that in each group consisting of a pair of soft-magnetic salient pole sections (17A) and an intervening permanent-magnetic pole sections (16A), the permanent-magnetic pole section is offset in the preferred torque-development direction from a central position between the soft-magnetic salient pole sections.

14. An electric machine comprising a ferromagnetic first part (11) having a plurality of teeth (11C) arranged in a row, a ferromagnetic second part (12; 112) having a plurality of permanent-magnetic poles (16; 116) arranged in a pole row confronting the row of teeth of the first part (11) and spaced from the row of teeth by an air gap (18), bearing means supporting the first and second parts (11, 12; 112) for relative movement along the air gap, and winding means (15) associated with the first part (11) for producing a multipolar magnetic field continuously travelling along the air gap (18) and linking the first and second parts across the air gap, the travelling magnetic field having an even number of poles and a pole pitch corresponding to the pole pitch of the pole row of the second part (12; 112), characterized in that at least one pole, preferably each of an even number of poles, of the pole row of the second part (12; 112) comprises a permanent-magnetic pole section (16; 116) and an adjacent soft-magnetic salient pole section (17; 117), and the soft-magnetic salient pole section (17; 117) over at least a portion of its length along the air gap (18) has at the surface thereof facing the air gap a saturation flux density which is no higher than the flux density in the air gap which causes magnetic saturation of the teeth (11C) of the row of teeth of the first part (11), wherein the second part (112) comprises a plurality of first-type and second-type laminations (112A, 112B) of soft-magnetic material which are perpendicular to the air gap (18), the second-type laminations (112B) being interleaved with the first-type laminations (112A), a peripheral region (112C) of each of the second-type laminations (112B) has a plurality of apertures (112D), each aperture being axially aligned with a corresponding aperture of the other second-type laminations (112B) to form an axially extending cavity for receiving one of the permanent-magnetic pole sections (116), the said peripheral regions (112C) of the second-type laminations (112B) extending radially beyond the first-type laminations, and portions of said peripheral regions (112C) located between the cavities forming the soft-magnetic pole sections (117).

* * * * *